United States Patent [19]

Hsiung et al.

[11] Patent Number: 4,980,145
[45] Date of Patent: Dec. 25, 1990

[54] LIQUID PHASE CARBON MONOXIDE SHIFT PROCESS

[75] Inventors: Thomas H. Hsiung, Emmaus; Robert B. Moore; Robert F. Weimer, both of Allentown, all of Pa.

[73] Assignee: Air Products and Chemicals, Inc., Allentown, Pa.

[21] Appl. No.: 461,956

[22] Filed: Jan. 8, 1990

Related U.S. Application Data

[63] Continuation of Ser. No. 221,162, Jul. 19, 1988, abandoned, which is a continuation-in-part of Ser. No. 127,829, Dec. 2, 1987, abandoned.

[51] Int. Cl.$^5$ ............ C01B 3/16; C01B 31/20
[52] U.S. Cl. .................. 423/437; 423/655; 423/656
[58] Field of Search .............. 423/655, 656, 437

[56] References Cited

U.S. PATENT DOCUMENTS 3,539,298  11/1970  Fenton .................. 423/655

FOREIGN PATENT DOCUMENTS

0163532  12/1985  European Pat. Off. .

Primary Examiner—Wayne A. Langel
Attorney, Agent, or Firm—James C. Simmons; John M. Fernbacher

[57] ABSTRACT

The present invention relates to a water-gas shift process which is carried out in a non-aqueous, high boiling liquid medium, either in an ebullated or slurry mode. The function of the liquid is to provide a heat sink for the exothermic reaction thereby allowing for better performance and longer catalyst life. The process, termed "liquid phase shift" (LPS) preferably uses commercially available vapor-phase low temperature shift (LTS) catalysts to accomplish the shift reaction. Because of the isothermality of the LPS process and its ability therefore to take advantage of higher catalyst activity, the average operating temperature is typically 260° C. (500° F.). This compares favorably to the lower average operating temperature for the conventional vapor-phase LTS process, which is typically 240° C. (465° F.). In addition, the LPS process can handle high carbon monoxide content feeds, e.g. 75 vol % carbon monoxide on a dry basis, without experiencing excessive catalyst deactivation. High carbon monoxide content feeds cannot be handled by convention LTS processing.

14 Claims, 3 Drawing Sheets

*PRIOR ART*

LIQUID PHASE CARBON MONOXIDE SHIFT PROCESS

The present application is a continuation of U.S. Ser. No. 07/221,162, filed July 19, 1988, abandoned which is a continuation-in-part application of U.S. Ser. No. 07/127.829 filed Dec.2, 198, abandoned.

TECHNICAL FIELD

The present invention relates to a water gas shift process, more specifically, the present invention relates to the use of a solid catalyzed, liquid phase (three phase) reactor system in the water gas shift process.

BACKGROUND OF THE INVENTION

The water gas shift reaction s widely used in synthesis gas related industries. Modern ammonia plants, hydrogen plants, as well as methanol plants use the shift reaction to improve overall plant efficiency. For instance, in ammonia plants, carbon monoxide leakage exiting shift reactors has a dramatic impact on plant economics. If the price of natural gas is $3 per MMBTU, each additional 0.1% CO leakage will cost $380,000 to $700.000 per year for a 1.500 TPD plant.

The shift reaction is exothermic and the carbon monoxide conversion is limited by thermodynamic equilibrium. Low exit carbon monoxide concentration can only be achieved at relatively low temperatures and/or high steam to gas ratios. Higher temperatures improve the reaction kinetics but can adversely affect catalyst life. Conventional technology uses staged, packed bed catalytic reactors with inter-bed cooling or shell-and-tube heat exchanger type of reactors with catalyst either in the tube side or the shell side such as described in U.S. Pat. No. 4,721,611. The reaction exotherm. e.g., 10° C per 1% CO in feed for a typical steam to gas ratio, imposes a limitation on the maximum carbon monoxide conversion that can be achieved in a single conventional gas phase reactor.

U.S. Pat. No. 1,843,540 and Australian patent No. 9017/27 suggest a liquid phase CO shift process using water as the 1lquid medium. Because the European Patent Application EP No. 0 163 532 A2 teaches the use of a solid catalyst to promote the shift reaction of CO and $H_2O$ to $CO_2$ and $H_2$. Comparison Example 1 at Page 11 described the use of oxygenated non-aqueous solvents in which the catalyst is suspended while promoting the reaction between CO and $H_2O$. The solid catalyst is a Group VIII metal carbonyl compound chelated with a basic nitrogen-containing ring compound which may be suspended in an aqueous solution or bonded to a carrier material, shift catalysts require a reaction temperature of higher than 200° C. and water has relatively high vapor pressures, these two patents are therefore limited to relatively high system pressure to avoid excessive vaporization of water. In fact, in an example, U.S. Pat. No. 1,843,540 (Column 3, Line 45) used 150 to 200 atmosphere for the shift reaction. Such a high system pressure requirement often makes the process impractical.

Two types of shift reactors are commonly used in the industry, the high temperature shift (HTS) and the low temperature shift (LTS) reactors. Normally, when the process stream is hot and contains excess steam a system consisting of HTS reactors followed by LTS reactors is used. HTS reactors, operated at around 370°–590° C. (700°–1100° F.), convert the bulk of the carbon monoxide in the feed gas, and LTS reactors, operated at around 200°–260° C. (390°–500° F:, polish the stream further. The state-of-art catalysts for HTS and LTS are $Fe_2O_3/Cr_2O_3$-based and o $CuO/ZnO$-based respectively. The $CuO/ZnO$ ATS catalyst has a temperature limitation because it deactivates rapidly and becomes uneconomical at high temperatures, i.e. >277° C. (530° F.). With the temperature limitations on carbon monoxide conversion and catalyst deactivation, it is important to control reactor temperature. Hot spots in the reactor should be minimized. This problem becomes more pronounced when carbon monoxide concentration in the gas stream is higher (because more reaction heat is to be generated). Another disadvantage associated with the conventional technology is that the disposal of spent HTS $Fe_2O_3/Cr_2O_3$ catalyst has some environmental concerns, i.e. chromium.

The standard solution to cope with this temperature problem is using multiple reactors in series with both intra-bed and inter-bed quenching and/or exchanger cooling approach. In spite of these attempts, significant temperature gradients still exist in the packed catalyst beds and impose some temperature limitation on operations.

In the case of cool and dry feed gases, such as basic oxygen furnace (BOF) off-gas or certain coal gasifier effluent gas, these gases must first be heated to HTS reaction temperature (370°–390° C.) and steam added. This heating of a feed gas requires expensive heat exchange equipment and costly superheated steam, adding costs to the process.

Another solution to heating and saturating of cold dry gas feed streams is the use of heat exchangers and/or saturator-cooler vessels that exchange heat and water vapor from the shift converter effluent with the shift converter inlet. The cost for this equipment is a significant burden to the cost of shift conversion. Moreover, the use of multiple beds with inter-bed cooling makes it prohibitively expensive to shift gases containing high concentrations of carbon monoxide.

SUMMARY OF THE INVENTION

The present invention relates to a water-gas shift process which is carried out in a non-aqueous, high boiling liquid medium, either ebullated mode with granulated catalyst or a slurry mode with powdered catalyst. Heat liberated by the shift reaction is effectively removed by the liquid present thereby allowing for better performance and longer catalyst life. In particular, the present invention is an improvement to a process for the conversion of a carbon monoxide containing feed gas in a water gas shift reaction to produce hydrogen and carbon dioxide, wherein the carbon monoxide containing feed gas is reacted with water (steam) at elevated temperatures and pressures in the presence of a solid catalyst. The improvement to &he process comprises reacting the carbon monoxide containing gas with steam at elevated temperatures and pressures in the presence of a solid catalyst in a liquid phase (three phase) reactor system.

The process of the present invention, termed "liquid phase shift" (LPS) preferably uses commercially available- vapor-phase low temperature shift (LTS) catalysts to accomplish the shift reaction. The catalyst is dispersed in a non-aqueous, high boiling, liquid medium, preferably a high boiling hydrocarbon. Liquid water as the liquid medium is inappropriate because the LTS catalyst deactivates very fast in the presence of liquid water. In the process, carbon monoxide containing gas is reacted in the presence of the dispersed catalyst in a liquid phase (three phase) reactor system. Because of the isothermality of the LPS process and its ability therefore to take advantage of higher catalyst activity at higher temperatures, the average typically operating temperature is 260° C. (500° F.). This compares favorably to the lower average operating temperature for the conventional Vapor-phase LTS process, which is typically 240° C. (465° F.). In addition, the feed gas to the present invention does not require as much feed gas preheating to sustain the reaction.

The LPS process can handle high carbon monoxide content feeds, e.g. 75 vol % CO on a dry basis. Examples of such high carbon monoxide content feeds are treated basic oxygen furnace (BOF) off-gas, partially oxidized oil or natural gas syngas and gasified coal syngas. The present invention can even convert feed gas streams which have a carbon monoxide content up to 100 vol % carbon monoxide.

A particular feature of the process of the present invention is the ability to introduce the water necessary for the shift reaction into the reactor as liquid water. This water is rapidly vaporized as the dew point in the reactor is below the operating temperature.

DETAILED DESCRIPTION OF THE INVENTION

The present invention is a carbon monoxide shift reaction process carried out in a liquid phase (three phase) reactor system in the presence of a solid catalyst dispersed in a non-aqueous, high boiling, liquid medium. Various liquid mediums are useable in the process; these include but are not limited to paraffins and cycloparaffins having 6 to 32 carbon atoms, aromatics, alcohols having 5 to 20 carbons atoms, esters having 5 to 12 carbon atoms, and ketones having 6–10 carbon atoms. The term high boiling in describing the liquid medium is meant to indicate that the liquid medium will remain in the liquid phase at the normal operating temperatures and pressures of the LPS process. The liquid is circulated in the catalytic system to absorb reaction heat. The reactor operation can either be in an ebullated mode with granulated catalysts or in a slurry mode with powdered catalysts. The solid catalyst and the liquid medium will be well mixed to provide a uniform temperature throughout the reactor. Reaction heat will be dissipated into the liquid almost instantaneously.

In addition, the heat sink provided by the liquid will heat or cool the incoming gas stream to the proper reaction temperature without expensive heat exchangers. In the case of a cold incoming gas, the heat required to raise the temperature is provided by heat of reaction of the shifted gas. Much of the steam required for the reaction can be obtained by direct injection of liquid water which also provides flexibility in temperature control of the reactor.

This catalytic reactor system is usually termed in the art as a liquid phase or three phase system. Whether the reactor system is a single reactor or two or more, staged or parallel, reactors will depend on the quantity of gas to be converted, the carbon monoxide concentration in the feed gas to the reactor(s) and the desired conversion of carbon monoxide (the carbon monoxide concentration allowed in the product gas). Typically, even for high feed gas carbon monoxide concentrations, e.g. about 75 vol% on a dry basis and product carbon monoxide concentrations down to about 1–2 vol % on a dry basis, a single reactor will suffice.

In a conventional gas phase shift system, multiple reactors are used for temperature control of the reaction gas. With a liquid phase shift system, multiple reactors are not required for temperature control. A liquid phase reactor system does, however, provide a great deal of back-mixing, thus the outlet gas is being continuously diluted with incoming gas making it impossible to reach equilibrium. The combination of series liquid phase reactors or a single liquid phase reactor followed by a gas phase reactor provides both excellent temperature control and a close approach to equilibrium for the effluent gas.

The liquid phase shift (LPS) process uses commercially available low temperature shift catalysts to accomplish the shift reaction under near isothermal conditions. Since this process offers excellent temperature control, it can handle very high carbon monoxide containing (hence high potential $\Delta T$) streams. In most cases, the LPS process can replace the entire conventional HTS process, especially when the process stream is relatively dry and needs to be heated for the shift reaction. In some cases, it has the potential to substitute for both the conventional HTS and LTS reactors in a plant. Substitution for all shift reactors (both HTS and LTS) depends on the individual application.

The present invention has at least two particular applications One of the applications is in ammonia plants to treat hot HTS feed gas with the aim to replace the existing HTS and/or LTS reactors. The second application is for cold and dry BOF off-gas treatment. Carbon monoxide concentration for this type of gas ranges from 60% to 75% by volume. This very high carbon monoxide containing gas can be shifted to produce $CO_2$ and $H_2$ with high conversions ($\sim 95\%$) without harming catalyst performance or life. Being able to absorb reaction heat effectively, the liquid phase shift (LPS) fits ideally for this BOF application. Other industrial gas streams which would be good candidates for the LPS process are:

Partial oxidation (POX) of oil which produces a syngas with $H_2:CO=1$ or POX of natural gas which produces a syngas with $H_2:CO=2$ Coal gasification generated synthesis gases with $H_2:CO$ in the range of 0.5 to 1.0

Product from a steam methane reformer.

The present invention can also handle and convert a feed gas stream which is 100 vol % carbon monoxide.

Numerous advantages are achieved with the process of the present invention when compared with conventional HTS/LTS processes. Some of these are as follow:

The liquid phase shift allows direct injection of liquid water into the reactor. This feature can eliminate the need for a steam generator and make the process more energy efficient. This is not possible with conventional reactors, as water spray mechanically damages the catalyst. Direct water injection minimizes equipment and energy costs.

As more active shift catalysts become available, LPS reactors (unlike the fixed bed reactors) can take full advantage of the catalyst activity by dissipating reaction heat are keeping the reactor temperature uniform. Thus, shift equilibrium can be achieved at lower temperature to yield low carbon monoxide leakage.

Deactivation of the LTS catalyst can be compensated by an advantageous feature of a LPS reactor where continuous catalyst addition and withdrawal can be exercised relativity easily.

Catalyst loading in a LPS reactor (an be adjusted on-stream to some extent to accommodate feed conditions. Reactor temperature can also be easily varied by controlling the slurry heat exchanger or by water injection. Because of the reactor isothermality, a higher average operating temperature and a wider operating temperature range is available for the LPS process.

The elimination of the HTS reactor has additional benefits. Normally, during the startup of a fresh HTS catalyst, the process gas is vented to prevent sulfur poisoning on the LTS catalyst. The sulfur comes from the Fe/Cr HTS catalyst. The disposal of Cr-containing spent HTS catalyst can be eliminated.

LPS can tolerate low steam/carbon (Steam/C) ratios. The energy conscious industry tends to run low Steam/C in a steam methane reformer to reduce energy cost. Low Steam/C produces high carbon monoxide inlet to the shift reactors. A LPS reactor cal absorb the additional heat of reaction effectively and maintain the reactor performance.

Figure 1:
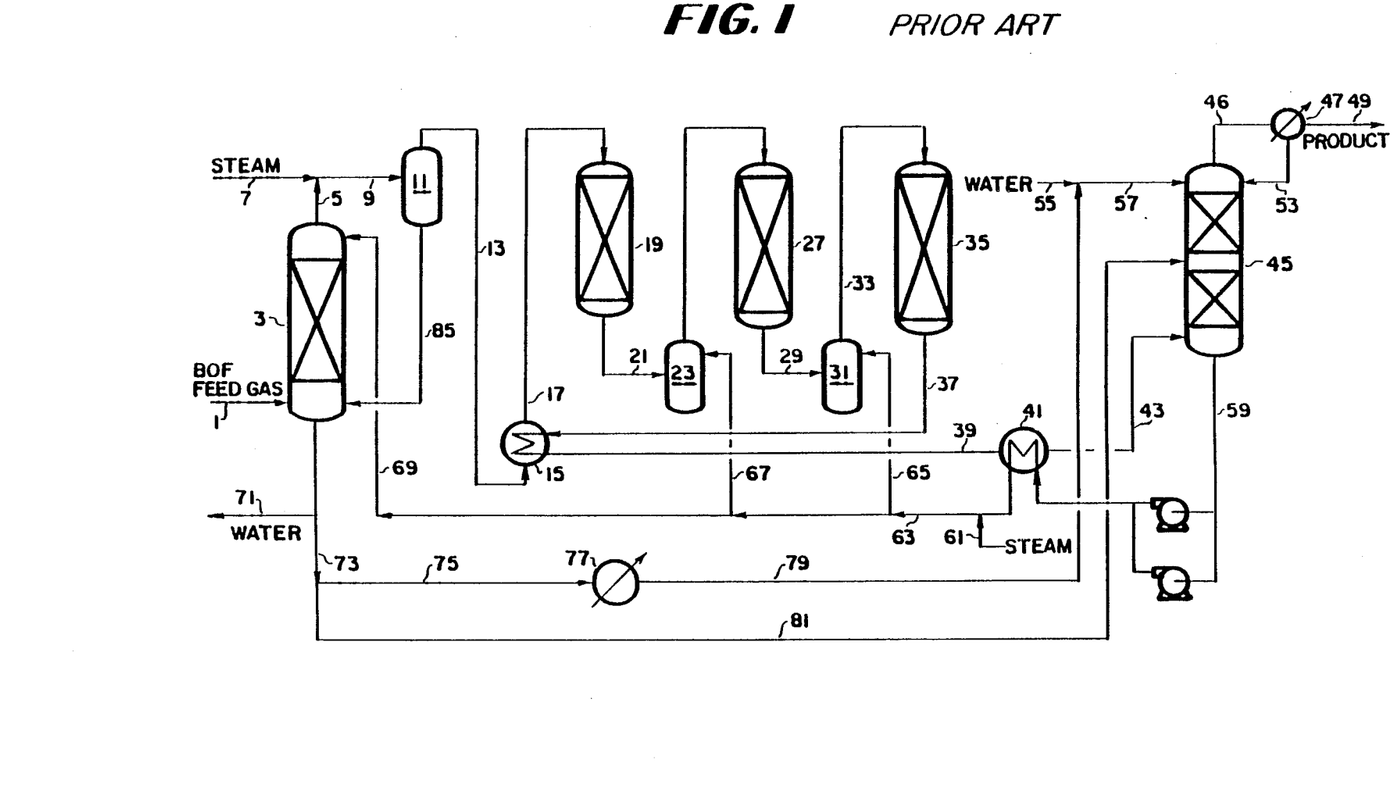
FIG. 1 is a schematic diagram of a conventional shift process for the conversion of BOF off-gas to hydrogen and carbon dioxide.
Figure 2:
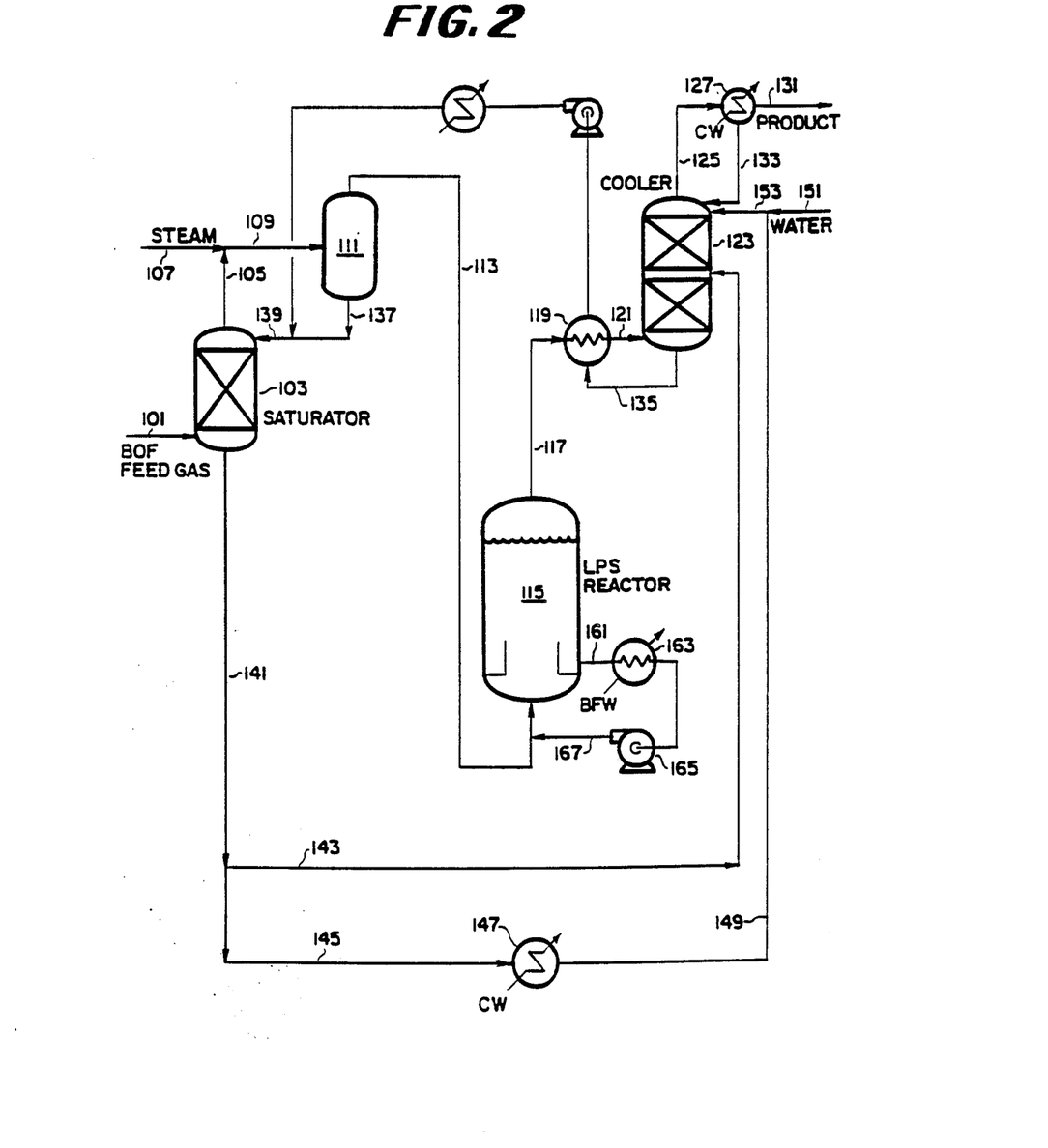
FIG. 2 is a schematic diagram of the process of the present invention for the conversion of BOF off-gas to hydrogen and carbon dioxide.

As mentioned earlier, the present process is applicable especially to very high carbon monoxide content gases, such as BOF off-gas. To demonstrate the superiority of the present invention for production of hydrogen and carbon dioxide via a shift reaction, the present invention process and the conventional process were computer simulated, using liquid phase shift reaction data obtained in the laboratory. The production of hydrogen and carbon dioxide from a treated BOF off-gas according to conventional gas phase technology is shown in FIG. 1. The production of hydrogen and carbon dioxide from a treated BOF off-gas according to the present invention is shown in FIG. 2.

It should be noted that the BOF off-gas must be treated to remove sulfur compounds prior to processing in either a conventional or liquid phase shift process. This treatment is not shown in FIG. 1 or subsequently in FIG. 2 because the preparation of the off-gas is not considered part of the present invention. To prepare BOF off-gas for the shift process, the off-gas from the BOF unit is routed to a gas holder; the gas holder is preferably a constant pressure variable volume unit. The off-gas from the gas holder is then filtered and compressed. Typically the feed compressor is a reciprocating lubricated 3-stage machine. Oil that is introduced into the gas for compression is removed by an oil filter/coalescer and an activated carbon oil absorber. After oil removal the BOF off-gas goes to a desulfurizer. Typically the desulfurizer is a two bed unit which is operated in series and is arranged so that either bed can be the lead or guard bed. The beds are packed with an activated carbon which has been promoted to remove sulfur compounds. The gas from the desulfurize, passes through a final filter before going on to the shift process.

As for the conventional shift process, with reference to FIG. 1, the desulfurized, filtered BOF off-gas is fed, via line 1, to process gas saturator 3. Process gas saturator 3 is a packed column wherein the cold, dry BOF off-gas is heated and evaporates water, recycled via line 69., by direct physical contact, thereby producing most of the steam required to shift the carbon monoxide to hydrogen and carbon dioxide. The vapor, in line 5, from saturator 3 is saturated. Additional water required for the shift reaction is added via stream 7, thereby forming combined stream 9. Combined stream 9 is fed to separator 11 to remove any traces of liquid water. The overheat from separator 11, line 13, is heat in a heat exchanger 15 to about 650° F. (343° C.) before being sent to shift vessels 19. 27 and 35. Shift vessels 19, 27 and 35 are designed to reduce the carbon monoxide concentration of gas from about 69% to about 2% on a dry basis by reacting the carbon monoxide with water to form hydrogen and carbon dioxide. The reaction is very exothermic. Heat is removed between beds by adding quench water in quench pots 23 and 31. The quench water is completely vaporized before the feed enters the next shift vessel. The first bed 19 is relatively small to limit the degree of reaction and exit temperature. The second and third beds 27 and 35, which are typically three to four times larger than the first bed, are controlled in operation by equilibrium rather than exit temperature as the constraint. The hot exit gas from shift vessel 35, line 37, is used to heat the feed, line 13, to the shift vessels in heat exchanger 15, is further cooled in heat exchanger 41, and finally cooled in cooler 45, by direct contact with water.

Cooler 45 is a packed tower, split into two beds. The bottom stream from cooler 45, line 59, is recycled to provide water to the process. The overhead of the cooler, line 46, is partially condensed in heat exchanger to remove any residual water entrained in the product stream. This condensed water is returned to cooler 45 via line 53, while the hydrogen and carbon dioxide product stream is removed via line 49. Water is supplied to the cooler via lines 57 and 81.

As mentioned above, the bottom stream removed via line 59 is pumped to pressure, initially heated in heat exchanger 41 and further heated by the direct introduction of steam via line 61. The heated, pumped water stream, now in line 63, is divided into three substreams. Substreams 65 and 67 provide water for cooling in quench pots 31 and 23, respectively. Substream 69 provides the primary source of water for process saturator 3.

To complete the balance of the streams, the bottoms of process saturator 3 is removed via line 73 and split into two substreams. Substream 75 is cooled in heat exchanger 77 and combined, via line 79, with fresh water in line 55 forming cooler water stream 57 feeding the upper section of cooler 45. Substream B1 provides water for an intermediate location of cooler 45. It should be noted that a small purge stream, line 71, can be withdrawn to maintain the water balance.

As for the process of the present invention, reference is made to FIG. 2, where pretreated BOF off-gas is fed via line 101 to saturator 103. The saturated vapor from saturator 103 in line 105 is combined with steam in line 107 to form a combined stream, line 109. The combined stream 109 is fed to separator 111 to remove gross liquid water that may be present. The overhead from saturator 111 is fed via line 113 to liquid phase shift (LPS) reactor 115. Prior to entering the reactor, a slurry recycle stream 161 from the LPS reactor 113, is added to stream 115 via line 167.

There are two alternatives to the front section of the process of the present invention as described in the previous paragraph. The first is an alternative to the use of saturator 103 in this alternative the BOF off-gas and the requisite amount of water would be fed directly into reactor 115. The second is an alternative to the use of recycle stream 167 for reactor temperature control (wherein a portion of the liquid medium of reactor 115 is removed via line 161, cooled in heat exchanger 163, and pumped by pump 165); in this alternative water would be injected into reactor 115 for reactor temperature control. These two alternatives can be used in conjunction with each other.

The reactor effluent from LPS reactor 115 is removed via line 117 cooled in exchanger 119 and fed to the product cooler, via line 121. The overhead product from cooler 123 is removed via line 125 and fed to cold water condenser 127. Liquid water is condensed out and returned to the cooler via line 133 and the product stream is removed via line 131.

The bottom stream from the cooler, which is mostly water, is removed via line 135, warmed in heat exchanger 119, pumped, further heated and returned to saturator 103. Prior to entering saturator 103, the hot water line 135 is united with any bottoms water from separator 111, line 137,, and is fed to the saturator via line 139. Bottoms from the saturator 103 in line 141 are split into streams 143 and 145.

First substream 143 is fed to an intermediate location of cooler 123. Second substream 145 is cooled further in cold water heat exchanger 147 forming cooled stream 149. Cold water stream 149 is then united with fresh make up water in stream 151 to form combined stream 153, which is fed to the top of cooler 123.

Material balances and process conditions for selected streams utilizing the conventional process and the process of the present invention are given in Tables I and II respectively. The material balances and stream conditions for FIG. 1 (Table I) and FIG. 2 (Table II) have been computer simulated. First, the design basis for both processes is shown and then the material balances; the design bases are as follows:

|  | Conventional Process | Liquid Phase Process |
|---|---|---|
| Feed Gas Flow Rate: | | |
| lb-mol/hr @ 430 psia, 100° F. | 448.0 | 448.0 |
| Feed Composition: mol % | | |
| Carbon Monoxide | 69.0 | 69.0 |
| Carbon Dioxide | 15.0 | 15.0 |
| Oxygen | <0.1 | <0.1 |
| Nitrogen | 14.0 | 14.0 |
| Water | <0.2 | <0.2 |
| Hydrogen | 2.0 | 2.0 |
| Shift Temperature: °F. | 650–900 | 482 |
| Shift Pressure: psia | 420 | 420 |
| CO Conversion: % | 95 | 95 |
| Reactors: | 3 HTS packed beds | 1 LPS reactor |
| Shift Section Product Rate: | | |
| lb-mol/hr @ 399 psia, 115° F. | 740 | 740 |
| Shift Section Product Composition: mol % | | |
| Carbon Monoxide | 2.0 | 2.0 |
| Carbon Dioxide | 48.0 | 48.0 |
| Oxygen | <0.1 | <0.1 |
| Nitrogen | 8.0 | 8.0 |
| Water | <0.4 | <0.4 |
| Hydrogen | 41.0 | 41.0 |
| Final Products: lb-mol/hr | | |
| Hydrogen | 223 | 223 |
| Carbon Dioxide | 348 | 348 |

TABLE I

CONVENTIONAL HIGH TEMPERATURE SHIFT PROCESS
BOF OFF-GAS
METERIAL BALANCE AND OPERATING CONDITIONS FOR SELECTED STREAMS

| | Stream Number: | | | | | | | | | | | | |
|---|---|---|---|---|---|---|---|---|---|---|---|---|---|
| | 1 | 5 | 9 | 17 | 21 | 25 | 29 | 33 | 37 | 39 | 43 | 49 | 71 |
| Flow Rates: # mol/hr | | | | | | | | | | | | | |
| CO | 308.2 | 307.9 | 307.7 | 307.9 | 131.4 | 131.4 | 29.5 | 29.5 | 15.2 | 15.2 | 15.2 | 15.6 | — |
| $CO_2$ | 67.0 | 69.7 | 69.7 | 69.7 | 245.9 | 246.1 | 347.9 | 348.1 | 362.4 | 362.4 | 362.4 | 358.0 | — |
| $O_2$ | 0.5 | 0.1 | 0.1 | 0.1 | 0.1 | 0.1 | 0.1 | 0.1 | 0.1 | 0.1 | 0.1 | 0.4 | — |
| $N_2$ | 62.8 | 61.9 | 61.9 | 61.9 | 61.9 | 61.9 | 61.9 | 61.9 | 61.9 | 61.9 | 61.9 | 62.0 | — |
| $H_2O$ | 1.1 | 555.7 | 728.5 | 730.7 | 554.4 | 688.6 | 586.7 | 681.7 | 667.4 | 667.4 | 667.4 | 3.3 | 93.0 |
| $H_2$ | 8.9 | 9.8 | 9.8 | 9.8 | 186.1 | 186.2 | 288.1 | 288.1 | 302.4 | 302.4 | 302.4 | 300.7 | — |
| Total | 447.7 | 1004.9 | 1177.9 | 1179.9 | 1179.9 | 1314.2 | 1314.2 | 1409.3 | 1409.3 | 1409.3 | 1409.3 | 739.9 | 93.0 |
| Process Conditions | | | | | | | | | | | | | |
| P (PSIA) | 430 | 425 | 425 | 423 | 422 | 420 | 418 | 418 | 416 | 414 | 412 | 399 | 45 |
| T (°F.) | 100 | 390 | 401 | 650 | 916 | 700 | 835 | 700 | 718 | 509 | 375 | 115 | 100 |
| Other Information | | | | | | | | | | | | | |

TABLE I-continued
CONVENTIONAL HIGH TEMPERATURE SHIFT PROCESS
BOF OFF-GAS
METERIAL BALANCE AND OPERATING CONDITIONS FOR SELECTED STREAMS

| | | | | | | | |
|---|---|---|---|---|---|---|---|
| CO: dry vol % | | 68.5 | 68.5 | 21.0 | 21.0 | 4.1 | 4.1 | 2.1 |
| H$_2$O/CO, in | | | 2.37 | | 5.24 | | 23.1 | |
| $K_{eq} = \frac{(CO_2)(H_2)}{(CO)(H_2O)}$ | | | | 0.63 | | 5.79 | | 10.80 |
| T (°F.) | | | | 916 | | 835 | | 718 |
| T$_{eq}$ °F. | | | | 1770 | | 894 | | 766 |
| T °F. (approach to eq.) | | | | 854 | | 59 | | 48 |

| | Stream Number: | | | | | | | | | | | |
|---|---|---|---|---|---|---|---|---|---|---|---|---|
| | 55 | 69 | 73 | 75 | 81 | 79 | 57 | 59 | 63 | 65 | 67 | 7 | 61 |
| Flow Rates: # mol/hr | | | | | | | | | | | | | |
| CO | — | — | 0.5 | 0.3 | 0.2 | 0.3 | 0.3 | 0.3 | — | — | — | — | — |
| CO$_2$ | — | 5.4 | 2.7 | 1.5 | 1.2 | 1.5 | 1.5 | 7.1 | 7.1 | 0.1 | 0.1 | — | — |
| O$_2$ | — | — | 0.3 | 0.2 | 0.1 | 0.2 | 0.2 | 0.2 | 0.1 | — | — | — | — |
| N$_2$ | — | 0.1 | 0.3 | 0.1 | 0.1 | 0.1 | 0.1 | 0.1 | 0.1 | — | — | — | — |
| H$_2$O | 119.3 | 4779.8 | 4225.2 | 2302.9 | 1922.2 | 2302.9 | 2422.2 | 5008.6 | 5315.6 | 95.0 | 134.2 | 175.0 | 307.0 |
| H$_2$ | — | 1.0 | 0.1 | 0.1 | — | — | 0.1 | 1.8 | 1.8 | — | — | — | — |
| Total | 119.3 | 4786.3 | 4229.0 | 2305.0 | 1923.9 | 2305.0 | 2424.3 | 5017.7 | 5324.6 | 95.1 | 134.3 | 175.0 | 307.0 |
| Process Conditions | | | | | | | | | | | | | |
| P (PSIA) | 399 | 425 | 427 | 427 | 427 | 399 | 399 | 399 | 435 | 419 | 420 | 435 | 435 |
| T (°F.) | 100 | 415 | 303 | 303 | 303 | 140 | 138 | 349 | 415 | 415 | 415 | 453 | 453 |

TABLE II
LIQUID PHASE SHIFT PROCESS
BOF OFF-GAS
MATERIAL BALANCE AND OPERATING CONDITIONS FOR SELECTED STREAMS

| Stream Number | 101 | 105 | 109 | 113 | 117 | 137 | 139 | 121 | 131 | 151 | 141 | 145 | 143 |
|---|---|---|---|---|---|---|---|---|---|---|---|---|---|
| Flow Rates: # mol/hr | | | | | | | | | | | | | |
| CO | 308.1 | 307.7 | 307.7 | 307.7 | 15.2 | — | — | 15.2 | 15.7 | — | 0.5 | 0.3 | 0.2 |
| CO$_2$ | 67.0 | 70.0 | 70.0 | 70.0 | 362.5 | — | 5.4 | 362.5 | 357.6 | — | 2.3 | 1.2 | 1.0 |
| O$_2$ | 0.4 | 0.4 | 0.4 | 0.4 | 0.4 | — | — | 0.4 | 0.4 | — | — | — | — |
| N$_2$ | 62.1 | 61.9 | 61.9 | 61.9 | 61.9 | — | 0.1 | 61.9 | 62.0 | — | 0.3 | 0.1 | 0.1 |
| H$_2$O | 1.1 | 557.1 | 732.1 | 729.9 | 437.4 | 2.2 | 4782.0 | 437.4 | 3.3 | 119.7 | 4225.9 | 2303.4 | 1922.6 |
| H$_2$ | 9.8 | 9.8 | 9.8 | 302.3 | — | 1.0 | 302.3 | 300.5 | — | 0.1 | — | — | — |
| Total | 447.7 | 1007.0 | 1182.0 | 1179.8 | 1179.8 | 2.2 | 4788.5 | 1179.8 | 739.5 | 119.7 | 4229.1 | 2305.1 | 1924.0 |
| Process Conditions | | | | | | | | | | | | | |
| P (PSIA) | 430 | 425 | 425 | 425 | 415 | 425 | 425 | 412 | 399 | 399 | 427 | 427 | 427 |
| T (°F.) | 100 | 391 | 401 | 401 | 437 | 401 | 415 | 375 | 115 | 100 | 302 | 302 | 302 |

| Stream Number | 149 | 153 | 135 | 107 |
|---|---|---|---|---|
| Flow Rates: # mol/hr | | | | |
| CO | 0.3 | 0.3 | — | — |
| CO$_2$ | 1.2 | 1.2 | 7.2 | — |
| O$_2$ | — | — | — | — |
| N$_2$ | 0.1 | 0.1 | 0.2 | — |
| H$_2$O | 2303.4 | 2423.1 | 4779.9 | 175.0 |
| H$_2$ | — | — | 1.8 | — |
| Total | 2305.1 | 2424.8 | 4789.1 | 175.0 |
| Process Conditions | | | | |
| P (PSIA) | 399 | 399 | 399 | 435 |
| T (°F.) | 140 | 138 | 319 | 453 |

Also, to further demonstrate the process of the present invention, three experimental runs were made of the process of the present invention utilizing BOF off-gas; the composition of which was approximately, on a dry volume basis. 60% carbon monoxide, hydrogen. 15% carbon dioxide, and 24% nitrogen or inerts. The catalyst system was a mixture of a commercial low temperature shift catalyst powder and Freezene 100 oil. The actual lab run conditions and exit compositions using this gas are shown in the following Table III.

TABLE III
LIQUID PHASE SHIFT WITH BOF OFF-GAS
EXPERIMENTAL RESULTS

| Run | Temp. °C. | Press. psig | GHSV l/kg-hr | H$_2$O/CO inlet | Exit Gas Composition: dry vol % | | | | CO Conv. |
|---|---|---|---|---|---|---|---|---|---|
| | | | | | CO | H$_2$ | CO$_2$ | N$_2$ | |
| 1 | 249 | 200 | 2000 | 2.0 | 4.1 | 36.6 | 42.8 | 16.5 | 90.0 |
| 2 | 242 | 325 | 940 | 1.5 | 1.4 | 38.1 | 44.5 | 16.0 | 96.4 |

TABLE III-continued

| | | LIQUID PHASE SHIFT WITH BOF OFF-GAS EXPERIMENTAL RESULTS | | | | | | | |
|---|---|---|---|---|---|---|---|---|---|
| | Temp. | Press. | GHSV | $H_2O/CO$ | Exit Gas Composition: dry vol % | | | | CO |
| Run | °C. | psig | l/kg-hr | inlet | CO | $H_2$ | $CO_2$ | $N_2$ | Conv. |
| 3 | 240 | 325 | 680 | 1.5 | 1.2 | 38.8 | 44.9 | 15.1 | 96.7 |

As can be seen from the above listed runs, the process of the present invention in a single reactor can handle the carbon monoxide concentration of the BOF off-gas which is about sixty (60) dry volume percent producing a product gas having a carbon monoxide concentration of less than five (5) dry volume percent. In addition, the above runs were able to be operated isothermally.. the temperature rise during these runs never exceeded 1° C.

Figure 3:
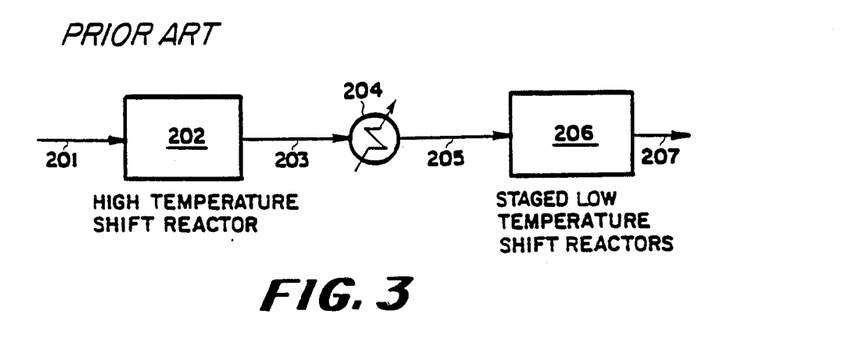
FIG. 3 is a schematic block diagram of the conventional shift process for conversion of moderate-to-high carbon monoxide feed gases to hydrogen and carbon dioxide.

The present invention is also useful for other high or moderate carbon monoxide concentration feed gases, in particular in the production of hydrogen for the synthesis of ammonia. Presently, the conventional process for producing hydrogen and carbon dioxide from higher carbon monoxide concentration feed gases is a staged process as depicted in FIG. 3. With reference to FIG. 3, the moderate-to-high carbon monoxide feed gas along with the requisite amount of water to produce the shift reaction is fed to high temperature shift reactor 202, via line 201. High temperature shift (HTS) reactor 202 can be either a single reactor or a series of reactors. Whether HTS reactor 202 is a single reactor or a series of reactors is dependent upon the carbon monoxide concentration in feed gas 201. The purpose of HTS reactor(s) 202 is to reduce the concentration of carbon monoxide in HTS reactor product gas stream 203 to about 3-4 volume percent on a dry basis. The HTS reactor product gas stream 203 is then cooled in heat exchanger 204. The cooled HTS product gas is then fed, via line 205 to low temperature shift (LTS) reactor 206. As shown in FIG. 3. LTS reactor 206 is typically a series of reactors. Because of the equilibrium forces at play in low temperature shift, temperature control is critical to the operation. The LTS reactor(s) 206 produce a final hydrogen and carbon dioxide product stream having a carbon monoxide concentration o=less than one (1) dry volume percent. The following Table IV lists stream operating conditions and compositions for a typical processing stream for a conventional process utilizing a single HTS reactor and two staged LTS reactors.

TABLE IV

| CONVENTIONAL HTS/LTS PROCESS AMMONIA PLANT APPLICATION MODERATE-TO-HIGH CARBON MONOXIDE CONCENTRATION FEED GAS | | | | |
|---|---|---|---|---|
| Stream | 201 | 203 | 205 | 207 |
| Temperature: °F. | | 732 | 848 | 395 | 402 |
| Pressure: psia | | 466 | 466 | 430 | 411 |

TABLE IV-continued

| CONVENTIONAL HTS/LTS PROCESS AMMONIA PLANT APPLICATION MODERATE-TO-HIGH CARBON MONOXIDE CONCENTRATION FEED GAS | | | | |
|---|---|---|---|---|
| Stream | 201 | 203 | 205 | 207 |
| Composition: mol % (dry basis) | | | | |
| Carbon Monoxide | 12.8 | 3.2 | 3.2 | 0.3 |
| Hydrogen | 55.5 | 59.3 | 59.3 | 60.5 |
| Carbon Dioxide | 7.5 | 15.5 | 15.5 | 17.8 |
| Inerts | 24.2 | 22.0 | 22.0 | 21.4 |
| Other Information | | | | |
| Dew Pt: °F. | 365 | 345 | 345 | 335 |
| $H_2O/CO$ ratio | 4.15 | 12.5 | 12.5 | 133 |

Figure 4:
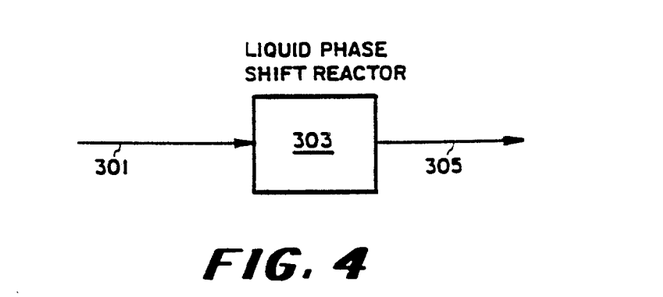
FIG. 4 is a schematic block diagram of the process of the present invention for the conversion of moderate-to-high carbon monoxide feed gases to hydrogen and carbon dioxide.

On the other hand, the process of &he present invention can produce a similar product without the need for three plus reactors; such process being shown in FIG. 4. With reference to FIG. 4, the moderate-to-high carbon monoxide feed gas along with the requisite amount of water to produce the shift reaction is fed to liquid phase shift reactor 303 via line 301. The product is removed from liquid phase shift reactor 303, via line 305.

To demonstrate the efficacy of utilizing the present invention for moderate-to-high carbon monoxide feed gases in ammonia synthesis type operations, three pilot plant runs were made. A commercially available low temperature shift catalyst is slurried in Freezene 100, a white mineral oil from Witco, and tested in an 1-liter stirred autoclave. The feed gas in each of the runs was a gas comprising about 13 vol % carbon monoxide. 55.5 vol % hydrogen, 7.5 vol % carbon dioxide, and 24 vol % inerts (e.g. nitrogen); all volume percentages are expressed on a dry volume basis. Table V, below, details the products and the operating conditions for each of the three runs.

TABLE V

| | | LIQUID PHASE SHIFT EXPERIMENTAL RESULTS MODERATE-TO-HIGH CARBON MONOXIDE FEED GAS | | | | | | | |
|---|---|---|---|---|---|---|---|---|---|
| | Temp. | Press. | GHSV | $H_2O/CO$ | Exit Gas Composition: dry vol % | | | | CO |
| Run | °C. | psig | l/kg-hr | inlet | CO | $H_2$ | $CO_2$ | $N_2$ | Conv. |
| 1 | 225 | 325 | 2000 | 4.0 | 0.6 | 61.3 | 16.9 | 21.2 | 94.8 |
| 2 | 225 | 325 | 2000 | 4.0 | 0.9 | 59.5 | 17.3 | 22.3 | 92.6 |
| 3 | 275 | 450 | 6000 | 4.0 | 1.7 | 59.6 | 16.4 | 22.3 | 86.0 |

As can be seen from the above results, the single liquid phase shift reactor process of the present invention accomplishes similar results as the multireactor process of FIG. 3. It is important to note that the carbon monoxide reactor exit gas concentration is somewhat higher than the 0.2 dry volume percent of the conventional process. The somewhat higher carbon monoxide reactor exit gas concentration from the liquid phase shift process can easily be handled by feeding the exit gas to either a small conventional LTS gas reactor, a pressure swing adsorption unit, a cryogenic separation unit or any other purification apparatus or process which will reduce the remaining carbon monoxide concentration.

Liquid water has been found not to be an acceptable slurrying medium. An experiment was conducted in the 1-liter autoclave using the same commercial catalyst as the one used in the previous example and water as the slurrying liquid. After 4 hours running with the same feed gas in the previous example, the results are shown in Table VI and compared with a similar run with Freezene 100 as the slurrying liquid.

TABLE VI

COMPARISON OF LPS RESULTS USING LIQUID WATER WITH RESULTS FROM USING FREEZENE 100 AS SLURRYING MEDIUM

| Run | Temp. °C. | Press. psig | GHSV l/kg-hr | Liquid Medium | $H_2O/CO$ inlet | Exit Dry CO, % | CO Conv. |
|---|---|---|---|---|---|---|---|
| 1 | 205 | 450 | 2000 | Water | — | 4.5 | 62.2 |
| 2 | 205 | 300 | 2000 | Freezene | 4 | 1.75 | 85.5 |

Liquid water is obviously the worse slurrying medium. In addition, very fast catalyst deactivation was noted during the water slurry run. After 15 hours on syngas, the exit CO on a dry basis increased to 8.5%. The deactivation is further evidenced by catalyst analysis. Crystallite size analysis by X-ray diffraction showed the active copper crystallite D size grew from about 90 Å to over 500 Å after 15 hours on syngas using liquid water.

The present invention has been described with reference to several preferred embodiments thereof. These embodiments or examples should not be viewed as a limitation on the scope of this invention; such scope should be ascertained by the following claims.

We claim:

1. In a process for the conversion of carbon monoxide in a carbon monoxide-containing feed gas by way of a water gas shift reaction to produce hydrogen and carbon dioxide, wherein the carbon monoxide in the carbon monoxide-containing feed gas is reacted with water at elevated temperatures and pressures in the presence of a solid catalyst, the improvement comprising reacting the carbon monoxide-containing gas with water at elevated temperatures and pressures in the presence of the solid catalyst dispersed in a non-aqueous, high boiling, liquid medium in a liquid phase (three phase) reaction system wherein the three phases consist of a non-aqueous liquid phase, a solid catalyst phase, and a gas phase.

2. The process of claim 1 wherein the catalyst utilized is characterized as a low temperature shift catalyst.

3. The process of claim 1 wherein the liquid phase reactor system is a single liquid phase reactor.

4. The process of claim 1 wherein the liquid phase reactor system is a staged reactor system comprising at least two liquid phase reactors in series.

5. The process of claim 1 wherein the liquid phase reactor system is at least one liquid phase reactor staged to be followed by a conventional packed bed (gas phase) reactor.

6. The process of claim 1 wherein the liquid phase reactor system is operated in an ebullated mode with a granulated catalyst.

7. The process of claim 1 wherein the liquid phase reactor system is operated in a slurry mode with a powdered catalyst.

8. The process of claim 1 wherein the carbon monoxide containing gas comprises between 60 and 75 volume percent carbon monoxide on a dry gas basis.

9. The process of claim 1 wherein the carbon monoxide containing gas is treated off-gas from a basic oxygen furnace.

10. The process of claim 1 wherein the carbon monoxide containing gas is a partially oxidized oil or natural gas syngas.

11. The process of claim 1 wherein the carbon monoxide containing gas is a gasified coal syngas.

12. The process of claim 1 wherein the carbon monoxide containing gas is product from a steam-methane reformer.

13. The process of claim 1 wherein water required for the reaction is introduced into the liquid phase shift reactor system as liquid water.

14. The process of claim 1 wherein both the carbon monoxide containing feed gas and the water required for the reaction are both fed directly to the liquid phase reactor system.

* * * * *